Aug. 1, 1933.  A. HUGUENIN  1,920,698
ADJUSTABLE GATE FOR BOTH WAYS OF FLOW IN SUBSTANTIALLY HORIZONTAL SLUICES
Filed Dec. 5, 1930   3 Sheets-Sheet 1
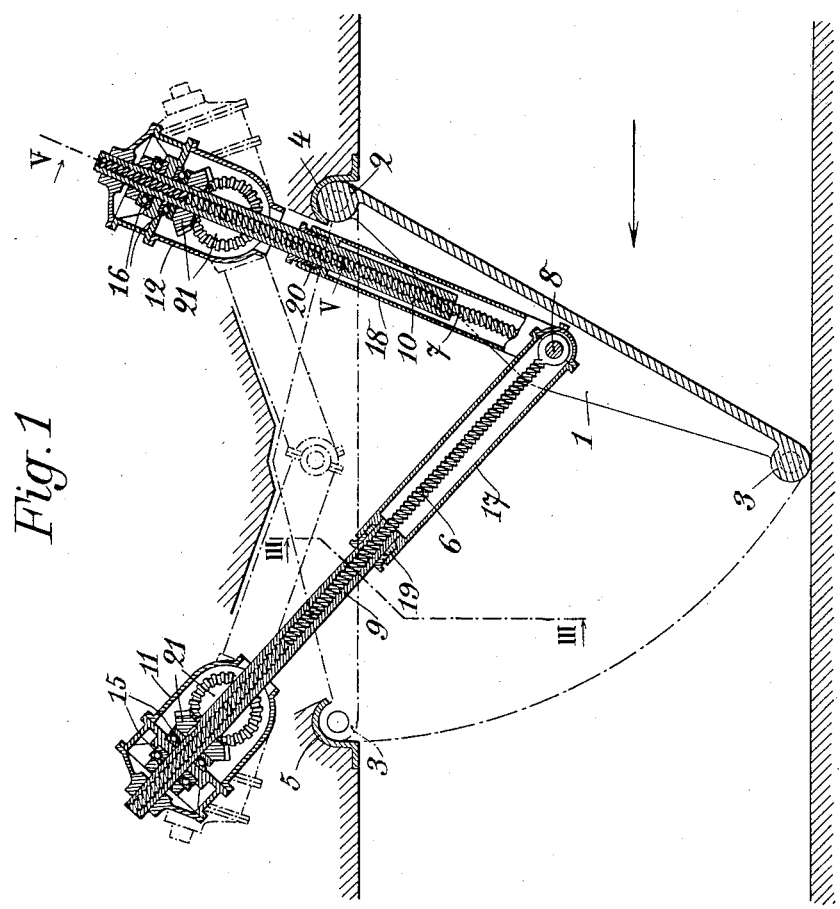
A. Huguenin
INVENTOR
By: Marks & Clerk
Attys.

Aug. 1, 1933.  A. HUGUENIN  1,920,698
ADJUSTABLE GATE FOR BOTH WAYS OF FLOW IN SUBSTANTIALLY HORIZONTAL SLUICES
Filed Dec. 5, 1930  3 Sheets-Sheet 2
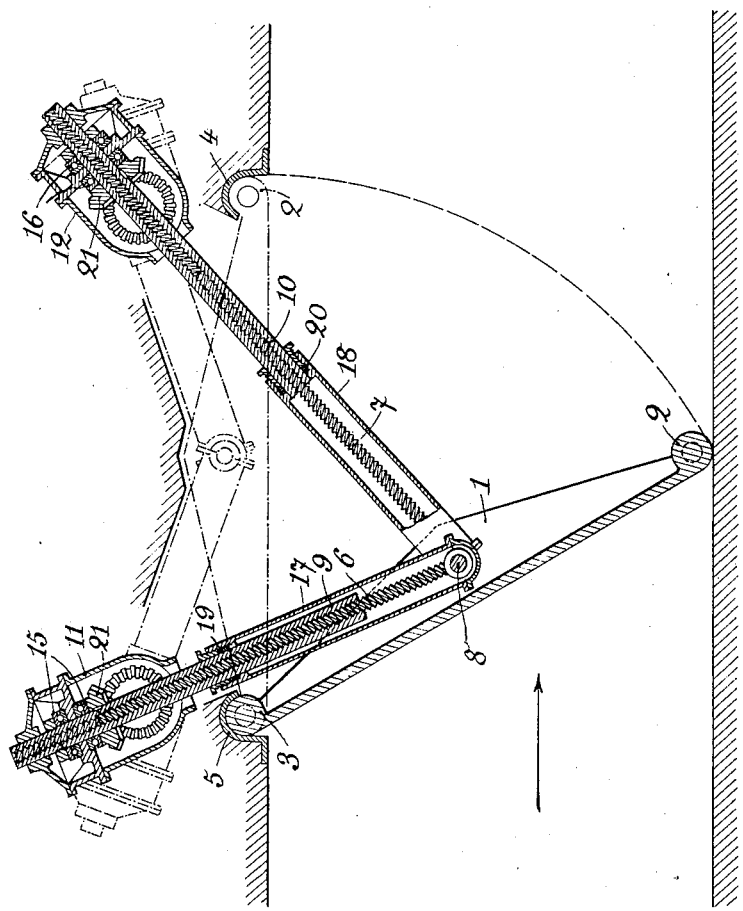
A. Huguenin
INVENTOR
By: Marks & Clerk
ATTYS.

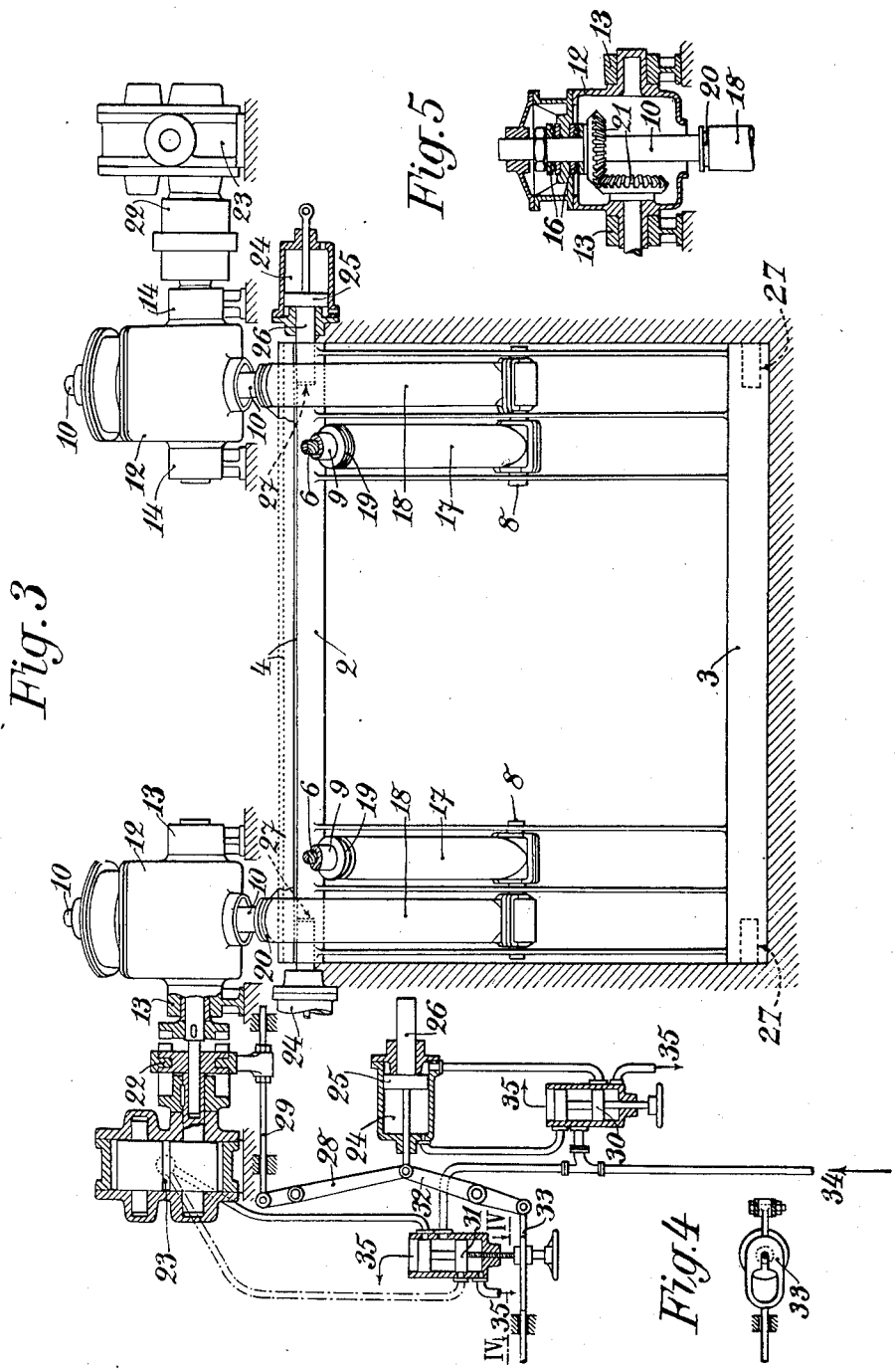

Patented Aug. 1, 1933

1,920,698

UNITED STATES PATENT OFFICE 1,920,698

ADJUSTABLE GATE FOR BOTH WAYS OF FLOW IN SUBSTANTIALLY HORIZONTAL SLUICES

Albert Huguenin, Paris, France

Application December 5, 1930, Serial No. 500,347, and in France February 25, 1930

5 Claims. (Cl. 251—10)

The flowing of water through substantially horizontal sluices has sometimes to be controlled in both ways, while the free space which can be disposed of above the sluice for the actuating gears is very small.

It is besides necessary to avoid any groove in the walls of the sluice to obtain the best possible coefficient of outflow.

The present invention has for its object a device which is meant to fulfill entirely these conditions.

The annexed drawings show, by way of example only, an embodiment of the object of the invention.

Figures 1 and 2 are longitudinal sections through the sluice with the gate in closed position in full lines, and in open position in dash and dotted lines.

Fig. 1 corresponds to a flow from right to left of the drawings and Fig. 2 to a flow in the opposite direction.

Fig. 3 is a cross section of the sluice, showing the operating mechanism, this section being made according to the line III—III of Fig. 1.

Fig. 4 is a partial horizontal cross section according to the line IV—IV of Fig. 3.

Fig. 5 is a cross section according to the line V—V of Fig. 1, showing details of the actuating device.

1 represents the gate itself which is preferably made of built-up iron work; its two edges 2 and 3 of cylindrical shape forming, alternately, a hinge in bearings 4 and 5 incorporated in the masonry. The gate 1 is moved by screwthreaded rods 6 and 7 fixed to the gate by means of the pins 8. These threaded rods with 45° multithread, mesh with nuts 9 and 10 held in the housings 11 and 12, which are fixed to the masonry by means of the bearings 13 and 14. Double thrust ball bearings 15 transmit the thrust of the nuts 9 to the housings 11 and similar double thrust ball bearings 16 transmit the thrust of the nuts 10 to the housings 12. Sleeves 17 and 18 protect the screw threaded rods 6 and 7 and are made tight on the nuts 9 and 10 by stuffing boxes 19 and 20.

Each nut is driven by bevel gears 21 through an adjustable coupling 22 by a servo-motor 23.

At the ends of the bearings 4 and 5 are located cylinders 24 with pistons 25, the ends of the pivot rods 26 passing into corresponding holes 27 in the edges of the gate. (In Fig. 3, the left-hand cylinder 24 is shown removed and carried outside and lower so as to show the mechanical connection between the corresponding piston 25 and the coupling 22 of the servo-motor more clearly). By means of a lever 28 and rod 29 each piston 25 actuates a coupling 22, which is switched in when the pivot rod 26 is pushed out of a hole 27, and loosened when the pivot-rod 26 is moved into the hole 27. The movement of the piston 25 is controlled by the slide valve 30 and that of the servo-motor 23 by the slide valve 31. The lever 32 combined with a rod 33 holds the slide valve 31 in its rest position when the pivot rod 26 moves into the hole 27 of the edge of the gate. Oil under pressure produced by a pump (not shown on the drawings) is delivered by a main pipe 34, and a return conduit to the pump collects the oil issuing from the different exhaust conduits 35.

The mechanical connection 28, 29, the valves 30, 31 and the organs connected to them are represented on the left side of Fig. 3 only, but it is plain that similar devices are connected with the other pistons 25 and servo-motors.

The movement of the gate is controlled in the following manner:

When the gate 1 is in its open position, as shown in dash and dotted lines in Fig. 1, the pivot rods 26 at the ends of its edges 2 and 3 are engaged into the holes 27. In order to shut the gate, the servo-motors of housings 11 are moved, and the corresponding couplings 22 of the said housings have to be switched in after the pivot rods 26 at the edge 3 have been disengaged. By unscrewing the rods 6 out of their nuts 9, the gate turns around its edge 2. In order to get this motion, the slide valves 30 are first operated to disengage the pivot rods 26; when this first motion is finished, the couplings 22 are switched in and the slide valve 31 is freed so that it can move, and the servo-motors are actuated to shut the gate. The screwthreads being reversible, and the couplings 22 of the housings 12 being loose, the screw threaded rods 7 follow the movement of the gate, and turn idly in their nuts 10. The stopping of the servo-motors 23 at a suitable moment permits holding the gate 1 in any intermediate position or in its closed position. The opening of the gate is effected in a similar way till it reaches its uppermost position as marked in dash and dotted lines in Fig. 1. The flow is thus possible from right to left for any possible position of the gate along completely even walls without any interruption thereof. The tightness may be secured along both edges 2 and 3 and along the edges in the vertical plane by means of the usually utilized devices.

In the open position of the gate 1 it is at any time possible to switch couplings 22 of the housings 12, thus withdrawing the pivot rods 26 from the holes 27 of the edge 2, engaging the pivot at the edge 3, and disengaging at the same time couplings 22 of the housings 11. The gate remains in its open position. When the water flows from the left to the right, the servo-motors 23 of the housings 12 may be actuated in the same manner as hereinabove described, so that the gate 1 can take the position represented in Fig. 2, thus shutting the sluice. It can also take, of course, any intermediate position.

A gate is actuated by at least two symmetrically disposed gears, which are of course moved synchronically.

The servo-motors may be of the mechanical, hydraulic, pneumatic, or electric type. The figures show one form of execution and it is obviously possible to conceive different designs, without departing from the scope of the invention.

The height above the sluice required for the gear is very small, and occupies only a fraction of the height of the sluice.

I claim:

1. In combination a horizontal sluice having even bottom and side walls and an upper wall having a recess therein, and a shutting gate adapted to be selectively pivoted at its opposite ends and to seat in its closed position against the sluice walls to prevent flow therethrough, sliding pivot rods placed at the two corresponding opposite ends of the said recess, holes being provided at the ends of said gate and adapted to receive said pivot rods respectively, and means for engaging and disengaging these pivot rods into said holes.

2. In combination a horizontal sluice having even bottom and side walls and an upper wall having a recess therein, a shutting gate adapted for being housed entirely in said recess when lifted and to fit with its edges against the walls of the sluice when rotating about the one or the other of its ends to prevent flow through the sluice, said gate having provided in its ends lateral holes, sliding pivot rods adapted for engaging said lateral holes and means for pushing said pivots into said holes and for disengaging them either at one end of the gate or at the other end.

3. In combination a horizontal sluice having even bottom and side walls and an upper wall having a recess therein, a gate adapted to shut off fluid flow within the sluice by seating in either direction against the walls of the sluice and adapted to fit in its open position entirely in said recess and to be then flush with the upper wall of the sluice, pivoting means at the two opposite ends of said gate, pivoting means at the two corresponding opposite ends of said recess and adapted to selectively cooperate with said pivoting means of said gate, and means for causing said gate to pivot about said pivoting means at one or the other end of said recess.

4. In combination a horizontal sluice having even bottom and side walls and an upper wall having a recess therein, a gate adapted to shut off fluid flow within the sluice by seating in either direction against the walls of the sluice and adapted to fit in its open position entirely in said recess and to be then flush with said upper wall of the sluice, pivoting means at the two opposite ends of said gate, pivoting means at the corresponding opposite ends of said recess and adapted to selectively cooperate with said pivoting means of said gate and extensible actuating members pivoted on the one hand on the middle of said gate and on the other hand on fixed points placed over said pivoting means for the ends of the gate, said extensible members being adapted to cause said gate to pivot about said pivoting means at one or the other end of said recess.

5. In combination a horizontal sluice having even bottom and side walls and an upper wall having a recess therein, a gate adapted to shut off fluid flow within the sluice by seating in either direction against the walls of the sluice and adapted to fit in its open position entirely in said recess and to be then flush with the upper wall of the sluice, pivoting means at the two opposite ends of said gate, pivoting means at the two corresponding opposite ends of said recess and adapted to selectively cooperate with said pivoting means of said gate, extensible actuating members each of them comprising a screw-threaded rod pivoted on the middle of said gate, a socket in screw-threaded engagement with said rod, a bearing pivoting about a horizontal axis in an end of said recess, guiding and abutment means in this bearing to maintain said socket, allowing it to rotate and keeping it from moving axially, and driving means for turning said socket.

ALBERT HUGUENIN.